(No Model.)
J. R. BODELL.
TIRE TIGHTENER.
No. 262,173. Patented Aug. 1, 1882.
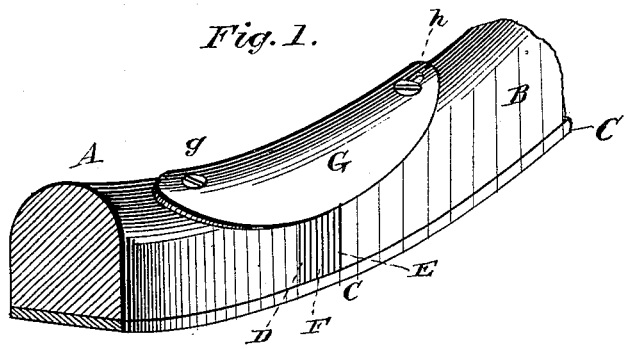
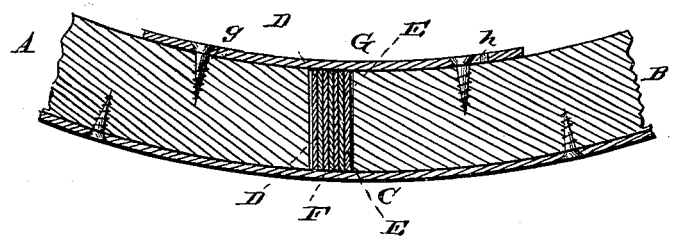
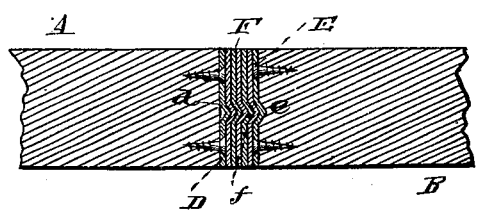
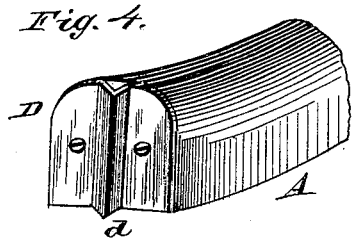
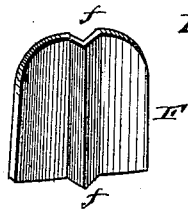
WITNESSES:
INVENTOR.
John R. Bodell,
by Louis Bagger & Co.
ATTORNEYS.

UNITED STATES PATENT OFFICE.

JOHN R. BODELL, OF NEW SALEM, OHIO, ASSIGNOR OF ONE-HALF TO MILTON SPERRY, OF SAME PLACE.

TIRE-TIGHTENER.

SPECIFICATION forming part of Letters Patent No. 262,173, dated August 1, 1882.

Application filed May 29, 1882. (No model.)

*To all whom it may concern:*

Be it known that I, JOHN R. BODELL, of New Salem, in the county of Fairfield and State of Ohio, have invented certain new and useful Improvements in Tire-Tighteners; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of part of the rim of a vehicle-wheel provided with my improved tire-tightener. Fig. 2 is a longitudinal sectional view of the same. Fig. 3 is a longitudinal sectional view through a plane at right angles to the view shown in Fig. 2. Fig. 4 is a perspective end view of one of the fellies with its ribbed end plate; and Fig. 5 is a perspective view of one of the ribbed washers detached.

Similar letters of reference indicate corresponding parts in all the figures.

My improvement has relation to devices for tightening the tires of wheels for vehicles; and it consists in the detailed construction and combination of parts of a "tire-tightener," as hereinafter more fully described and claimed.

In the accompanying drawings, A and B represent two of the fellies of a wheel, and C the tire. The end of the felly A is faced with a sheet-metal plate, D, which has a longitudinal rib, *d;* and the end of the opposite felly, B, is faced with a similar plate, E, having a rib, *e*, which rests in a groove made in the face of the felly. Thus it will be seen that when the two fellies A and B are placed together the rib *d* of plate D will project into the groove or recess formed by the rib *e* in plate E, plates D and E being made exactly alike.

To spread the fellies and thus tighten the tire, I insert one or more ribbed plates, F, between the end plates, D and E, underneath the sheet-metal clip or top plate, G. The latter has a round bolt-hole, *g*, and an oblong bolt-hole, *h*, the latter permitting the tires to spread or be withdrawn from each other by the insertion of the plates F. The latter, after having been inserted between the end plates, D and E, are kept in place by their ribs *f*, which will fit into or "nest" with the ribs of the contiguous plates, as shown in Fig. 3, while endwise motion is prevented in one direction by the tire and in the other by the clip or plate G. As many plates or washers F may be inserted between the stationary end plates, D and E, as are required to spread the fellies sufficiently to properly tighten the tire.

Having thus described my invention, I claim and desire to secure by Letters Patent of the United States—

The combination, in a wheel for vehicles, of the tire C, fellies A and B, faced, respectively, with the ribbed plates D and E, top plate, G, having bolt-hole *g* and slot *h*, and detachable washers F, having ribs *f*, adapted to "nest" with one another and with the ribs of the end plates, D and E, substantially as and for the purpose herein shown and described.

In testimony that I claim the foregoing as my own I have hereunto affixed my signature in presence of two witnesses.

JOHN R. BODELL.

Witnesses:
LEWIS H. YOUTZ,
JAMES ANDREWS.